Figure 1:
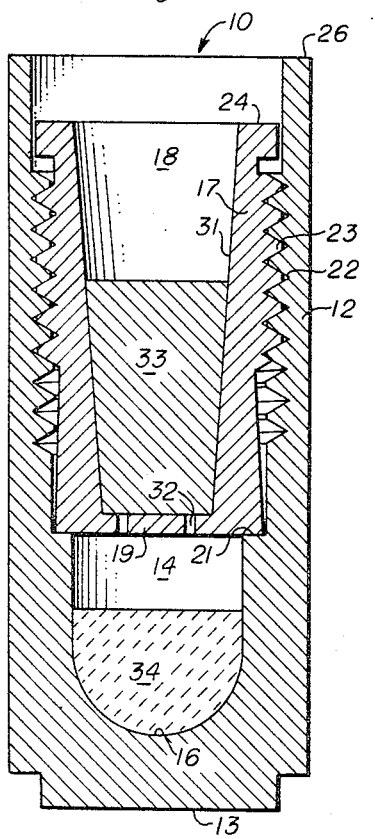

July 25, 1967   E. T. TEATUM   3,332,741

CRUCIBLE REACTOR AND METHOD

Filed July 18, 1963

INVENTOR.
EUGENE T. TEATUM
BY
ATTORNEY

3,332,741
CRUCIBLE REACTOR AND METHOD

Eugene T. Teatum, Berkeley, Calif., assignor to the United States of America as represented by the United States Atomic Energy Commission
Filed July 18, 1963, Ser. No. 296,145
1 Claim. (Cl. 23—204)

The present invention relates, in general, to methods and apparatus for conducting high temperature reactions and, more particularly, to a crucible reactor and method for conducting the reactions between certain materials at very high temperatures at which one of the reactants is relatively volatile.

In methods for producing various inorganic and intermetallic materials at high temperatures problems are encountered in which one or more of the reactants may be quite volatile at temperatures below the melting point, and/or reaction temperature at which the desired product is formed. Such problem is especially troublesome, for example, in procedures used for preparing the silicides of rare earth elements by reactions between silicon and the rare earth oxides. Temperatures of well above about 1000° C. applied in vacuum or in controlled inert atmospheres are required and the rare earth metal, e.g., cerium, however provided volatilizes at several hundred ° C. below the temperature at which the silicide forming reaction occurs. Accordingly, cerium may be lost from the reaction zone if a temperature sufficiently high to assure a rapid and complete reaction is employed. Close temperature control at the necesarily high temperature is difficult to attain and accordingly considerable variation in product composition and quality occurs. The difficulties are further magnified in that the reactants and especially the silicon metal reacts with the majority of refractory materials which are available for constructing reactor apparatus.

The present invention provides a crucible reactor apparatus and a method of operation which alleviates and minimizes difficulties incurred with those known heretofore. In accordance with the present invention the more volatile component, e.g., a rare earth oxide such as ceria, is arranged in such a manner that the material volatilized must preferentially contact the other reactant, e.g., silicon metal prior to escape. Also the arrangement provides that the second reactant when finally melted is brought into contact with the first to produce a substantially complete reaction as by means of the especially adapted crucible reactor of the invention. The crucible of the invention includes an upper chamber in which, e.g., the silicon is disposed and a lower chamber separated from the upper by a perforated member in which lower chamber the oxide form, for example, ceria, is disposed. Volatile material from the lower chamber may rise into the upper during early stages of heating to be absorbed or undergo surface reactions with the material therein and thereby be retained in the reaction mixture. Upon melting the material in the upper chamber descends into the lower chamber to undergo immediate reaction with the main body of reactant disposed therein.

Accordingly it is an object of the invention to provide methods and apparatus for conducting reactions between materials at very high temperatures at which one of said materials is relatively volatile.

Another object of the invention is to provide methods and apparatus for producing silicides of rare earth elements by the reaction of a rare earth metal oxide and silicon metal.

Still another object of the invention is to provide methods and apparatus for reacting rare earth metal oxides and silicon metal in which vapors of one of the reactants volatilized below the reaction temperature are preferentially contacted with the other reactant to be trapped and retained in the reaction zone.

A further object of the invention is to provide methods and apparatus for reacting ceria with silicon metal in which the silicon metal is disposed in an upper chamber and the ceria is disposed in a lower chamber of a reaction crucible whereby vapors from the ceria must preferentially contact the silicon metal and be retained in the reaction mixtures at temperatures below the reaction temperature.

Figure 3:
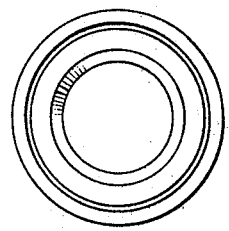
Figure 2:
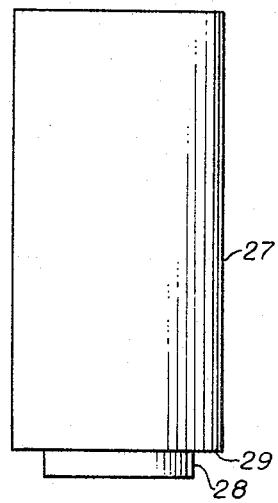

Other objects and advantages of the invention will be apparent in the following description and accompanying drawing forming a part of the present specification, of which drawing:

FIGURE 1 is a vertical cross-sectional view of the reactor crucible of the invention;
FIGURE 2 is an elevational view of a chimney element for use with the crucible reactor of FIGURE 1;
FIGURE 3 is a plan view of the reactor of FIGURE 1.

Rare earth metal silicides are often prepared by methods analogous to those set forth below having particular reference to the preparation of cerium disilicide. In accordance with one general prior art method the preparation is accomplished by intimately mixing powdered reactants and heating to produce a reaction as shown by the following equation:

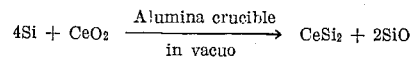

$$4Si + CeO_2 \xrightarrow[\text{in vacuo}]{\text{Alumina crucible}} CeSi_2 + 2SiO$$

wherein the reaction mixture is heated rapidly to 1100° C. and then gradually to 1600° C. in a time period of about one hour. While the foregoing reaction might appear to be rather simple and uncomplicated from the overall equation given above, serious difficulties are encountered in practical operations. The following table of melting and boiling points of materials and reactants used in the reaction are significant for understanding the cause of some of the difficulties.

TABLE I

| Material | M.P. (° C.) | B.P. (° C.) |
|---|---|---|
| Si (metal) | 1,420 | 2,355 |
| Ce (metal) | 804 | 2,900 |
| $SiO_2$ | 1,710 | 2,230 (2,590) |
| $CeO_2$ | 2,600 | |
| $CeSi_2$ | 1,710 | |
| $Al_2O_3$ | 2,020 | 3,500 |

The silicon metal can react effectively with ceria only at temperatures above the melting point of silicon (1420° C.) to yield cerium silicide with the evolution of SiO. Since this temperature is some 600° C. above the melting point of cerium metal, considerable cerium metal formed by reduction of ceria is found to vaporize from the reaction zone while the reactant mixture is being heated to the reaction temperature. Moreover, the reaction is exothermic and a considerable excursion of temperature occurs with attendant aggravated losses as the melting point reaction temperature is attained. Also the excursion is nonuniform since the excursion is initiated at localized regions of highest temperature due to local concentrations of molten cerium metal produced by the elevated temperature. Moreover, the reaction gases are released internally of the reaction mass so that the gases must expand upwardly through the charge yielding expansive effects accompanied by spattering producing reactant losses and undue porosity. The gas expansion is explosive at higher temperature even with the most strict temperature control. Thermal control and outgassing accordingly are serious problems with the conventional process described above.

The equation above is a net overall equation which overlooks subtle aspects of the reaction. The reaction mechanism is better illustrated by the following equations:

II.
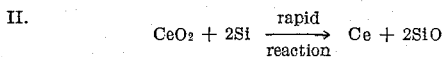
$$CeO_2 + 2Si \xrightarrow{\text{rapid reaction}} Ce + 2SiO$$

III.
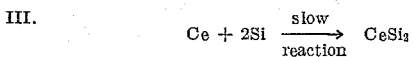
$$Ce + 2Si \xrightarrow{\text{slow reaction}} CeSi_2$$

A prerequisite for economical use and constancy of cerium content in the product is that all cerium remain in the product which result is not feasible with the melting point relations noted above when the reactants are intimately admixed in a composite reaction mixture during heating. The difficulty may be alleviated, in accordance with the invention, by maintaining the reactants substantially separate during rapid rate heating to a temperature at which Reaction III proceeds as rapidly as possible after completion of Reaction II and then to rapidly combine the reactants. This may be accomplished in apparatus wherein the powdered silicon metal is arranged to intercept vaporized cerium metal produced in a reduction zone during simultaneous heating and wherein the molten silicon metal may be moved into contact with the molten cerium metal as soon as the melting point is attained. Similar operations may be utilized with other materials disclosed elsewhere herein.

A crucible reactor apparatus especially adapted for operation in accordance with the foregoing is provided as shown at 10 in the FIGURE 1 of the drawing. The crucible reactor 10 includes an outer refractory receptacle body portion having generally cylindrical exterior walls 12 and closed by lower end wall 13. The receptacle body interiorly defines a cylindrical chamber 14 having a rounded bottom 16 constituting the interior surface of lower end wall 13 in which the more volatile reactant is disposed. Upper interior portions of the receptacle body are enlarged in order to accommodate an inner refractory receptacle thimble 17 defining a cavity 18 in which the less volatile reactant is disposed.

The receptacle portion 17 is generally arranged within the upper portion of the outer receptacle body in such a manner that the lower end wall 19 thereof serves as a closure for chamber 14. A sealed juncture of the receptacle portions is afforded by providing an outwardly diverging shoulder 21 in the interior wall of the outer receptacle body between the sidewall segment defining chamber 14 and the enlarged section mentioned above. A flat peripheral area of the lower face of end wall 19 can then abut against shoulder 21 in sealed relation with the receptacles arranged as above. The enlarged upper interior wall of the outer receptacle may be provided with threads 22 to be engaged by threads 23 on the exterior surface of receptacle 17 to secure the receptacles in the described position. In order to prevent material from the reaction or reactant mixture from entering the aforesaid threaded portion the upper end of the receptacle 17 is provided with an outwardly flanged rim 24 which is fitted closely within an enlarged interior circular terminal portion of the outer receptacle body. Preferably, the flanged rim of inner receptacle 17 is disposed below the level of the upper end 26 surface of the outer receptacle in order to accommodate a chimney extension 27 shown in FIGURE 2 of the drawing. The chimney 27 is in the form of an elongated tubular section of refractory material having a stepped outer wall portion 28 adapted to fit within the upper enlarged terminal end of the outer receptacle with the shoulder portion 29 bearing on end surface 26. A circular lid (not shown) may likewise be fitted upon the outer receptacle or at the top of chimney 27 if desired.

It is preferred that the inner walls 31 of receptacle 17 defining chamber 18 be tapered inwardly to facilitate removal of material therefrom. The lower end wall 19 is provided with one or more perforations 32 joining cavity 18 with chamber 14 for purposes set forth more fully hereinafter. For operations directed to the preparation of rare earth silicides and the like it is preferred that a plurality of spaced perforations 32 be provided in end wall 19 to minimize difficulties such as plugging of the perforations and to provide a sufficient area to permit ready passage of molten reactants but to retain materials such as powdered silicon in cavity 18. In some instances a single larger central orifice may be found suitable.

The foregoing construction has certain advantages in allowing a choice of the refractory materials of which the respective receptacles are constructed. Such receptacles may be of the same refractory material or of dissimilar materials selected on the basis of non-reactivity with the particular reactant or reaction product, etc. disposed therein. The crucible is suitable for use in electrical resistance heated furnaces as well as in R.F. induction heated furnaces if made of an electrical conductor or if a conductor sleeve or powder, e.g., graphite, is disposed in proximity thereto in the latter instance. Suitable high temperature refractory materials include graphite, alumina, porcelains, silica, tungsten, molybdenum, niobium, carbided and silicided refractory metals and others known in the art. Also either of the receptacles may be provided with liner inserts (not shown) of any of the foregoing materials or others as appropriate. Recrystallized high purity alumina crucibles or crucible liners have been found to be the most suitable for producing lanthanide rare earth metal silicides in relatively pure forms uncontaminated with crucible materials. A superior alumina crucible of the foregoing character is the high purity recrystallized alumina crucible of the Model XN–20 type furnished by Morganite Refractories, Ltd., England.

With reference to the production of metal silicides it may be noted that lanthanide rear earth metals such as cerium metal are extremely reactive and will reduce most oxides and other refractory compounds and silicon will react with most metals to form silicides. Accordingly, reaction mixtures of the foregoing materials will attack substantially any conceivable single refractory which can be used. For producing rare earth silicides such as ceric silicide, alumina, particularly in the recrystallized high purity form, displays good resistance to attack from intimate reaction mixtures. However, alumina does not couple to the R.F. energy source sufficiently for heating to temperatures of above about 1600° C. and an exterior refractory metal such as tantalum sleeve or sleeve of conductive material such as graphite should be disposed about an alumina or other poor electrical conductor refractory crucible if highest temperatures are required. With the present crucible construction graphite or other conductor can be used as the outer crucible receptacle if not attacked by the reactant disposed therein to attain the higher elevated temperatures. While graphite is attacked to some extent in the operation graphite inner and outer crucible receptacles can be used as a reducing agent to produce silicides by the procedure set forth hereinafter.

Utilizing the crucible reactor described above granulated or powdered silicon 33 is placed in cavity 18 of the receptacle 17 and powdered lanthanide rare earth oxide 34, e.g., ceric oxide, is placed in chamber 14 of the outer receptacle and the crucible is assembled as shown in FIGURE 1. Stoichiometric amounts or a slight excess of a reactant, i.e., lanthanide rare earth oxide, which tends to be lost from the lower chamber during the reaction due to extraneous effects may also be employed.

A small proportion of a reducing agent such as silicon metal itself, carbon or other reducing agents in stoichiometric amounts of 10 to 40% may be included with the rare earth oxide to initiate the autocatalytic reduction of said oxide discussed more fully hereinafter. The crucible with or without chimney attached and covered if necessary is disposed in an appropriate high temperature furnace, e.g., an induction heating furnace. An inert atmosphere of helium or argon of from ½ to about 1 atmosphere pressure is introduced into the furnace to displace air. Evacuated conditions below about ½ atmosphere are not satisfactory as losses of reactants and damages to the crucible reactor are usually aggravated. The temperature is raised rapidly to above about 1100° C. and more slowly until a temperature of about 1450° C., i.e., above the melting point of silicon, whereupon the molten silicon metal flows through perforations 32 to contact and react with cerium material in chamber 14 to form cerium silicide. During the heating operation any cerium vaporized must of course flow upwardly through perforations 32 into contact with the finely-divided silicon metal to be adsorbed on the surface or undergo surface reactions and be effectively retained.

Two modes of operation can occur when using a graphite receptacle. Cerium oxide in chamber 14 which is in contact therewith may undergo at least a partial reduction at temperatures betwen 1200° C. and about 1400 C. in an autocatalytic reaction with carbon of the receptacle. In the presence of other reducing agents such as Si similar effects are noted. The evolved $CO_2$ passing through perforations 32 prevents molten silicon from descending until the reducing reaction is complete and any cerium in the $CO_2$ gas is removed by contact with the silicon. Once all of the cerium oxide is reduced gas evolution ceases and the molten silicon metal descends to immediately react with the molten cerium in chamber 14. If, however, such a reduction reaction does not occur, i.e., the autocatalytic reduction is not initiated or if a non-reactive receptacle is employed molten silicon descends to react directly with the molten ceric oxide. Both methods of operation are accompanied by only negligible losses of reactants as compared to operations utilizing conventional crucible configurations. The reaction is somewhat exothermic and the temperature tends to rise considerably above the melting point once the reaction is initiated. Temperatures of above about 1600° C. to about 1900° C. may in some cases be required to produce a completely fused product. Once the reaction is complete as evidenced by cessation of SiO evolution, as determined by time-temp. plots, or the like, the crucible is cooled and the product is removed. Cerium silicide products having densities in the range of 5.0 to 7.0 g./cc. or more are easily produced. In some instances some silicon carbide is formed and appears in the product but may be removed by contact with water to hydrolyze the SiC analogous to the reaction of water with calcium carbide. Retention of the product at high temperatures of above about 1400° C. for extended periods of time, e.g., 2–4 hours or more produces a progressive refinement of grain structure, densification, lowering of resistivity, etc., with a tendency to approach a single crystal structure.

More specific details of the process operated as described in the foregoing will be set forth in the following table:

The temperature in the foregoing reactions rises rapidly at the time the $CeO_2$ is reduced and a second slower excursion occurs as the silicide reaction occurs as shown by time-temperature plots.

While there has been described in the foregoing what may be considered to be preferred embodiments of the invention modifications may be made therein without departing from the spirit of the invention and it is intended to cover all such as fall within the scope of the appended claim.

What is claimed is:

In a method for producing a rare earth metal silicide utilizing a crucible constructed of refractory material defining a lowermost reaction chamber in communication with an open top cavity receptacle in the upper portion with perforated wall means separating the chamber and cavity, and adapted to support powered reactant in the upper receptacle cavity, the steps comprising disposing powdered silicon metal on said perforated wall of said crucible in said receptacle cavity, disposing an oxide of a rare earth metal of a class which melts and vaporizes at a temperature below the melting point of silicon in said reaction chamber, supplying an inert gas atmosphere at a pressure in the range of about 0.5 to 1 atmosphere in said crucible, heating said oxide and silicon metal simultaneously to a first temperature above the melting point of said rear earth whereat any rare earth metal vaporized therefrom passes through said perforated wall to contact and be retained by the powdered silicon metal, and then simultaneously heating the oxide and silicon metal to a second temperature above the melting point of silicon whereat said silicon melts, flows through said perforated wall to contact and react with the rear earth metal oxide in said reaction chamber to form said rare earth metal silicide.

References Cited

UNITED STATES PATENTS

| 1,359,091 | 11/1920 | Morrell | 23—280 |
| 2,533,964 | 12/1950 | Scherer | 23—280 |
| 2,871,100 | 1/1959 | Guire et al. | 23—204 |

FOREIGN PATENTS

| 924,566 | 4/1963 | Great Britain. |

OTHER REFERENCES

Chemical Abstract, vol. 61, p. 3893 (a and b) August 1964—"Preparation and Properties of Some Rare Earth Silicides," 1963, by G. V. Samisonov et al.

OSCAR R. VERTIZ, *Primary Examiner.*

MILTON WEISSMAN, *Examiner.*

H. S. MILLER, *Assistant Examiner.*

TABLE II

| Charge Materials | Crucible Material | Temp. Range, ° C. | Run Time | Remarks |
| --- | --- | --- | --- | --- |
| 3.06 g. $CeO_2$, 2.0 g. Si (¼ Si in the ceria). | Graphite | 1,175–1,550 | 4 hrs | Product hard black, gave off no carbide odor. Sp. Gr. 5.83. |
| 3.06 g. $CeO_2$, 2.0 g. Si | do | Room Temp. to 1,000<br>1,000–1,590<br>1,435 (in vacuo) | 1¼ hrs<br>1⅓ hrs<br>40 min | Si popped several times—steady melt occurred at 1,425° C. (40 min. homogenizing time). Sp. Gr. 6.0. Yield 87.5%. |
| 3.06 g. $CeO_2$, 2.0 g. Si | do | Room temp. to 1,000<br>1,000–1,700 (in vacuo) | 1 hr<br>1 hr.+ | Temp. raised slowly to 1,400° C. to melt Si then temp. vs. time plotted to determine reaction time. Sp. Gr. 6.2. Yield 61.5%. |